Figure 1:
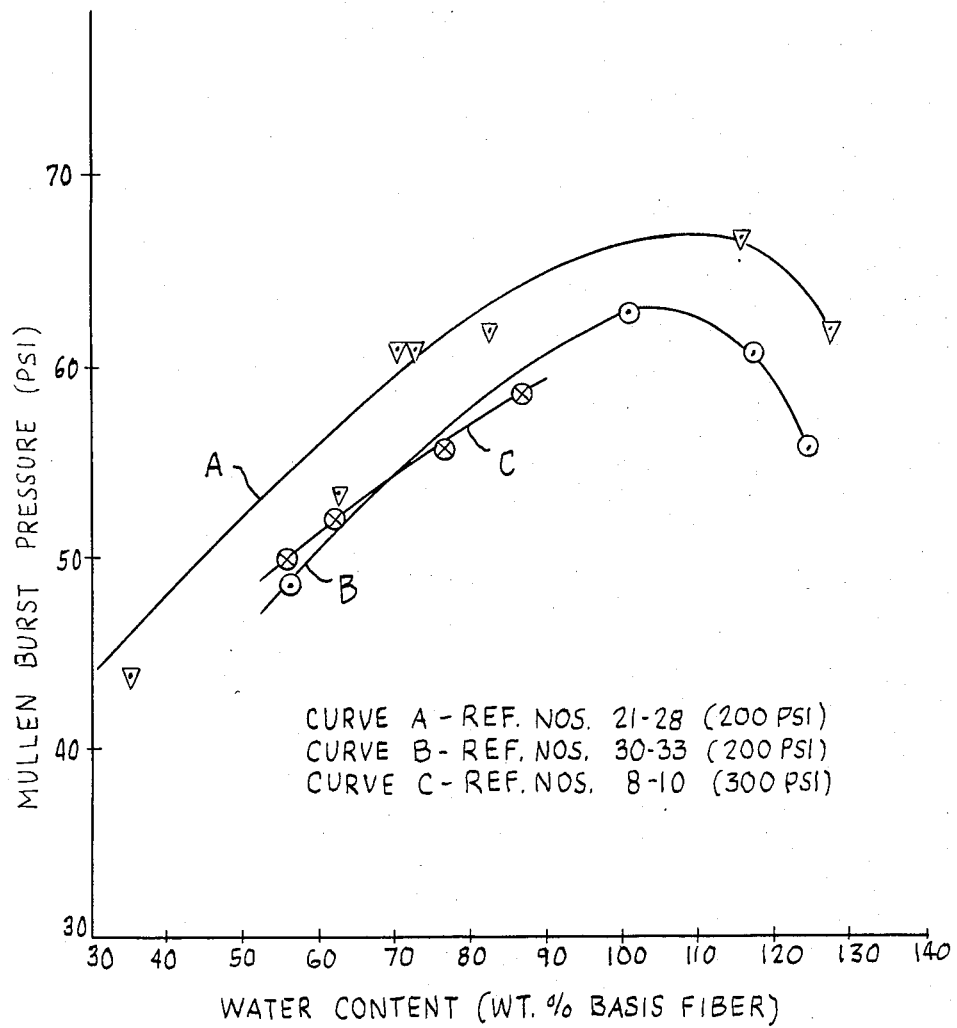

United States Patent [19]

Martin, Jr.

[11] Patent Number: 4,491,502

[45] Date of Patent: Jan. 1, 1985

[54] MOLDING OF PAPERBOARD CONTAINERS

[75] Inventor: Leslie L. Martin, Jr., Saginaw, Minn.

[73] Assignee: James River-Dixie/Northern, Inc., Norwalk, Conn.

[21] Appl. No.: 448,649

[22] Filed: Dec. 10, 1982

[51] Int. Cl.³ .............................................. D21H 5/12
[52] U.S. Cl. ................... 162/146; 162/218; 162/224
[58] Field of Search ............... 162/146, 117, 218, 223, 162/224, 231

[56] References Cited

U.S. PATENT DOCUMENTS

| 1,951,940 | 3/1934 | Manson | 162/224 |
| 1,988,161 | 1/1935 | Chaplin | 162/224 |
| 2,515,113 | 7/1950 | Chaplin | 162/223 |
| 2,986,490 | 5/1961 | Randall et al. | 162/224 |
| 3,236,722 | 2/1966 | Box | 162/224 |
| 3,305,434 | 2/1967 | Bernier et al. | 162/224 |
| 4,014,737 | 3/1977 | Brennan | 162/231 |

*Primary Examiner*—Peter Chin
*Attorney, Agent, or Firm*—William A. Aguele; Harry W. Hargis, III; Thomas H. Whaley

[57] ABSTRACT

Heat resistant ovenable paperboard containers are formed from wet sheets consisting essentially of cellulose fibers and containing 50 to 100 weight percent water based on the dry weight of the fibers by hot pressing in a mold at 200° to 400° F. Heat resistant synthetic fibers may be incorporated in wood pulp to produce the wet sheet and impart improved burst strength to the finished product.

12 Claims, 2 Drawing Figures

MOLDING OF PAPERBOARD CONTAINERS

This invention relates to a method for the manufacture of paperboard. In one of its more specific aspects, this invention relates to a method for forming a molded paperboard articles, e.g. trays, of predominately cellulosic fibers capable of withstanding food-baking temperatures for extended periods of time and to an improved ovenable paperboard product so produced.

In the art of manufacture of conventionally molded paperboard containers, such as trays, dishes and the like, for foods to be baked in the container, wet pulp sheets or blanks are placed in a hot press wherein the sheet is molded by pressing between heated dies to the desired shape. The resulting pressed shapes are dried by holding the molded article in the hot press for a period of time, e.g. 30 to 60 seconds, until the desired amount of drying takes place due to evaporation of water by heat from the dies. Containers so formed have been found capable of withstanding oven temperatures of up to about 218° C. (425° F.) for short periods of time. Typically, the hot molded paperboard containers have been found to lose tensile strength rapidly at a temperature of about 232° C. (450° F.) making them unsafe and generally unsuitable for oven use, i.e. for baking at temperatures above about 220° C.

By the process of this invention, paperboard containers may be produced which are capable of withstanding baking temperatures of about 235° C. for an extended period of time while still retaining safe tensile strengths.

In the method of this invention, a paperboard sheet is first formed from wood pulp fibers in a manner known in the art. Such sheets when formed from a wet pulp of paper-making wood fibers typically have a water content in the range of from about 300% to about 600% by weight, based on the dry weight of the fiber contained in the sheet. In my method, the formed sheet is then dried to a water content in the range of from about 50 to about 100% by weight as contrasted with drying to a water content in the range of 15 to 35 weight % or less conventional in the art. The partially dried sheet having a water content in the range of 50 to 100 weight percent is then subjected to pressing and drying in a matched metal die set of known construction, at a pressure between about 7 bar (about 100 psi) and 69 bar, (about 1000 psi) and at die temperatures between about 90° C. (about 200° F.) and about 205° C. (about 400° F.) to produce a molded paper container, e.g. a dish or tray having a much greater resistance to thermal degradation than that afforded by conventionally made paperboard trays. This method has been found to produce a molded paperboard product having improved strength characteristics after heating to 204° C. for one hour to simulate the most severe service such products are likely to encounter when used for baking breads, cakes, and other foods.

It is known in the prior art to produce paperboard sheets or blanks having a water content equal to or greater than the weight of the dry fiber. It is present practice to reduce the water content of the paperboard sheets to 15 to 35 weight percent moisture, as disclosed in U.S. Pat. No. 3,305,435, for example, before pressing the paperboard sheet or blanks cut from the sheet to the final container shape by heated dies.

In the preferred embodiment of the method of this invention, paperboard sheet is formed by known wet laid paper-making art from primarily softwood pulp, preferably having large thick-walled fibers and preferably pulped by the kraft process but not bleached.

It has been found that enhanced resistance to thermal degradation as determined by the Mullen burst test after exposure to a temperature of 400° F. for 1 hour is achieved when the product is manufactured in accordance with the method of this invention within the hereinabove described ranges of moisture content, pressing pressure, and pressing temperature. Resistance of the product to high temperatures increases only moderately with increase in pressure. Test data indicate that maximum increased thermal resistance is obtained at pressing temperatures between about 90° C. and 200° C.; a pressing temperature of about 190° C. is preferred. Water content of the wet sheet or blank is the most important factor affecting the quality of the product container, as measured by its bursting strength after exposure to a temperature of 232° C. for one hour, the product quality increasing with increase in moisture of the pressing stock content in the range of from about 50 weight percent up to about 100 weight percent and thereafter decreasing.

In another preferred embodiment of the process of this invention, wood fibers are admixed with from about 1 to about 8 weight percent heat resistant synthetic fibers the strength of the product manufactured in accordance with the method of this invention.

The addition of synthetic fibers into a primarily cellulosic substrate to improve tear resistance of paper products is known in the art. In the processes of the prior art, which are applied to the manufacturer of paper rather than to the manufacturer of ovenable paperboard, the synthetic fibers may be thermoplastic so that bonding may be obtained by heating the synthetic fiber to a temperature above its softening point. Alternatively, non-bonding synthetic fibers are employed with bonding agents, such as latex binders, resins, low melting thermoplastic coatings and the like.

It has now been found, unexpectedly, that when moist sheets of paperboard containing heat resistant, non-bonding synthetic fibers are exposed to paperboard forming pressures and temperatures, the synthetic fibers are bound within the cellulosic network. In the method of this invention, pressing is carried out with matching dies at a die temperature within the range of 90° C. to 204° C., which is well below the softening point or melting temperatures of the fibers. Synthetic fibers which may be bonded in this manner and which are preferred for use in the products of the present invention are Kevlar 49, nylon 6,6 and PET, a polyethylene terphthalate. Kevlar is a trademark designating a product made by du Pont, characterized as a high molecular weight aramide fiber, i.e. an aromatic polyamide; nylon 6,6 is a condensation product of adipic acid and hexamethylene diamine. Both produce very strong, heat resistant, high melting point fibers. For best results the pulp should comprise unbleached softwood kraft pulp and the synthetic fiber lengths should be within the range of one half inch to one and one half inches and have a diameter corresponding to 1.5 to 6 denier. In this embodiment of the invention, the pressing time within the heated dies should be within the range of 1 to 2 minutes.

Figure 2:
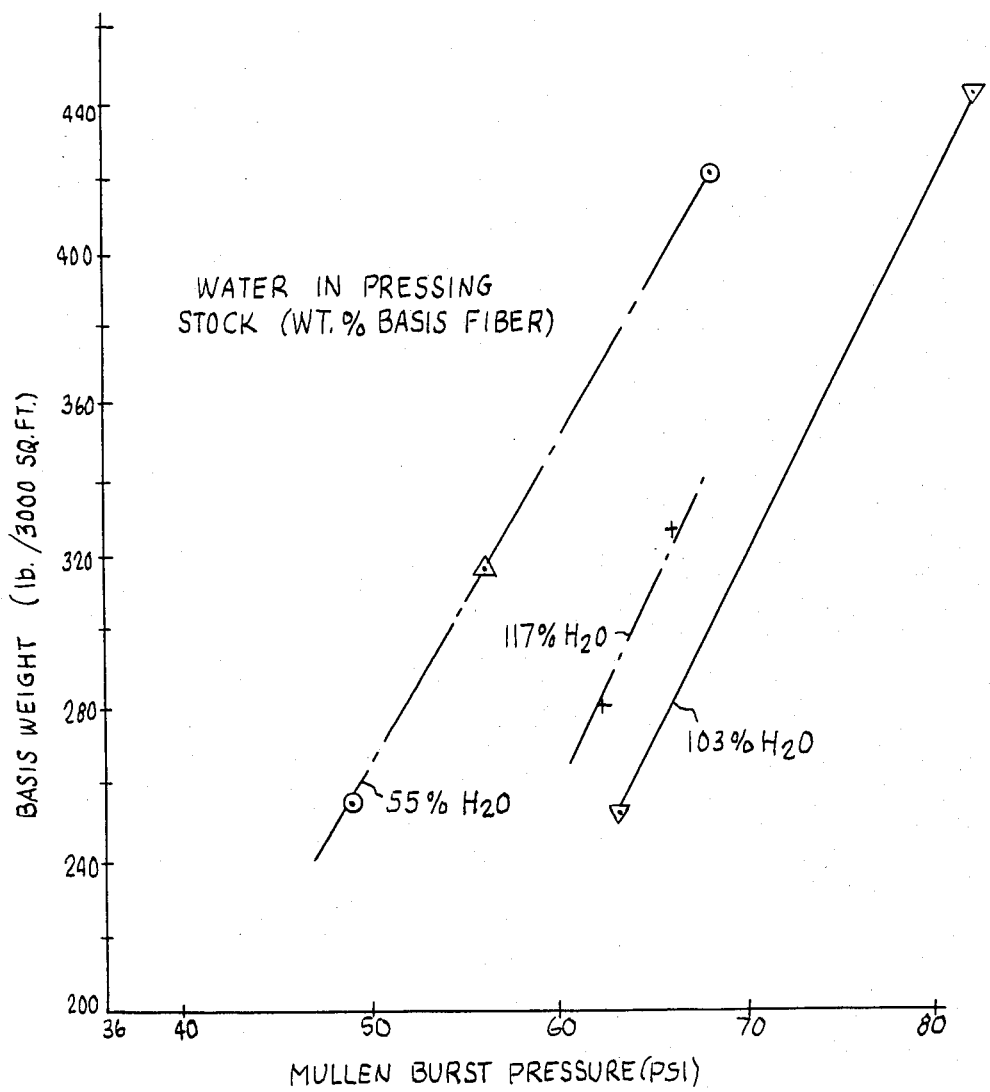

The method of this invention and the effects of the variables will be better understood from the following specific examples and the accompanying figures. FIG. 1 is a graphical representation of data from Table I of the Examples illustrating the effect of water content on the Mullen burst pressure of ovenable board after heating at 232° C. for one hour. FIG. 2 is a graphical representation of selected data from Table I illustrating the effect of basis weight of paperboard processed under comparable conditions as it affects the Mullen burst pressure after heating the board at 232° C. for one hour.

The strength of paperboard and its resistance to thermal degradation may be measured by the standard Mullen burst test which is fully described in TAPPI Method T8105SU-66, incorporated herein by reference. Briefly the test involves clamping a flat, thin sample between two rings having a 1 inch diameter hole in their centers and carefully aligned relative to one another. The clamped sample is then mechanically held while a rubber bladder is inflated against the sample sheet spanning the opening in the rings. The air pressure in pounds per square inch gauge necessary to force the bladder through the sample is recorded as the "burst". There is a good correlation between the Mullen burst test and the perceived "strength" of paperboard tray flanges when stressed by lifting the loaded tray. By comparison of Mullen burst test results after exposure of the paperboard to a temperature of 232° C. to simulate the most severe conditions likely to be encountered under use conditions at temperatures commonly employed for baking, e.g. temperatures of 200° and 232° C., resistance of various paperstocks to thermal degradation may be compared.

EXAMPLES

Wet sheets having an initial water content within the range of 300 to 600 percent by weight based on the dry weight of the wood fiber were made up from unbleached softwood kraft pulp having an average cell wall thickness of 2.4μ. The test sheets had basis weights ranging from 208 to 440 pounds per ream (3000 square feet). The sheets were dried to various moisture contents in the range of 20 to 130 weight percent water and the resulting moist sheets pressed and dried in a heated set of forming dies at 177° C. (350° F.), at pressing pressures ranging from 100 to 300 psi (6.8 to 2.1 bar).

Mullen burst test data were obtained from the product paperboard formed under the above conditions and subjected to thermal exposure of 232° C. for one hour. The observed Mullen burst test values in pounds per square inch are set out in Table I. In all of the following test runs, the pressing temperature was 177° C. (350° F.) and the pressing time was sufficient to produce substantial dryness. For convenience in comparison, the test results have been arranged in the order of decreasing basis weight in pounds per square inch, and have been arbitrarily assigned reference numbers for identification.

TABLE I

| Ref. No. | Basis Weight (lb/ream) | Moisture (wt. %) | Burst Pres. (psi) | Density (g/cm³) |
|---|---|---|---|---|
| A. Press Pressure 300 psi ||||| 
| 1 | 420 | 56 | 63 | .81 |
| 2 | 398 | 62 | 60 | .83 |
| 3 | 372 | 54 | 58 | .81 |
| 4 | 339 | 64 | 53 | .80 |
| 5 | 336 | 60 | 60 | .81 |
| 6 | 330 | 90 | 63 | .81 |
| 7 | 322 | 54 | 55 | .76 |
| 8 | 312 | 57 | 50 | .78 |
| 9 | 312 | 87 | 59 | .80 |
| 10 | 312 | 77 | 56 | .77 |
| 11 | 304 | 63 | 51 | .78 |
| 12 | 300 | 61 | 51 | .76 |

TABLE I-continued

| Ref. No. | Basis Weight (lb/ream) | Moisture (wt. %) | Burst Pres. (psi) | Density (g/cm³) |
|---|---|---|---|---|
| 13 | 277 | 68 | 51 | .77 |
| 14 | 274 | 79 | 49 | .76 |
| 15 | 273 | 57 | 49 | .73 |
| 16 | 263 | 63 | 49 | .76 |
| 17 | 232 | 50 | 43 | .71 |
| B. Press Pressure 200 psi ||||| 
| 18 | 440 | 88 | 75 | .85 |
| 19 | 434 | 103 | 82 | .86 |
| 20 | 421 | 54 | 68 | .75 |
| 21 | 338 | 73 | 61 | .73 |
| 22 | 335 | 83 | 62 | .76 |
| 23 | 332 | 71 | 61 | .76 |
| 24 | 329 | 129 | 62 | .84 |
| 25 | 329 | 116 | 66 | .83 |
| 26 | 317 | 62 | 56 | .69 |
| 27 | 317 | 75 | 56 | .72 |
| 28 | 314 | 35 | 44 | .59 |
| 29 | 312 | 64 | 53 | .69 |
| 30 | 284 | 119 | 61 | .80 |
| 31 | 282 | 125 | 56 | .82 |
| 32 | 256 | 56 | 49 | .64 |
| 33 | 252 | 102 | 63 | .80 |
| 34 | 208 | 110 | 48 | .74 |
| 35 | 202 | 63 | 38 | .63 |
| C. Press Pressure 100 psi ||||| 
| 36 | 364 | 42 | 58 | .54 |
| 37 | 349 | 22 | 43 | .46 |
| 38 | 345 | 38 | 41 | .46 |
| 39 | 345 | 42 | 52 | .53 |
| 40 | 338 | 61 | 61 | .58 |
| 41 | 330 | 21 | 48 | .48 |

FIG. 1 illustrates graphically the relationship between moisture content and burst pressure for selected comparable basis weight product board after exposure of the pressed board to a temperature of 450° F. (232° C.) for one hour.

FIG. 2 illustrates graphically the effect of basis weight of the stock on the Mullen burst pressure. For FIG. 2, data were selected from Table I B wherein comparable basis weight stocks of comparable moisture contents were pressed at 200 psi and 350° F. (177° C.). It will be observed that the slopes of the lines in FIG. 2 are essentially parallel and that an increase of about 10 pounds basis weight results in an increase in the Mullen burst pressure after baking for one hour at 450° F. (232° C.) of about one pound per square inch. These curves are useful as a basis for comparison of the test results reported in Table I.

Table II presents a comparison of selected data which show that under similar pressing conditions, when the moisture content of the board supplied to the press exceeds about 100 percent it exhibits a negative effect on strength of the board. In each instance, the board was pressed to substantial dryness at 177° C. and the Mullen burst test was made after exposure of the pressed board to a temperature of 232° C. for 1 hour. This effect is illustrated graphically in FIG. 1.

TABLE II

Maximum Moisture Level Indication

| Ref. No. | Pressing Pres. (psi) | Basis Weight (lb/ream) | Prepressing Moisture % | Burst Strength (psi) |
|---|---|---|---|---|
| 24 | 200 | 329 | 129 | 62 |
| 25 | 200 | 329 | 116 | 66 |
| 6 | 300 | 330 | 90 | 63 |
| 21 | 200 | 338 | 73 | 61 |
| 31 | 200 | 282 | 125 | 56 |
| 29 | 200 | 284 | 119 | 61 |
| 13 | 300 | 277 | 68 | 51 |

TABLE II-continued

| | Maximum Moisture Level Indication | | | |
|---|---|---|---|---|
| Ref. No. | Pressing Pres. (psi) | Basis Weight (lb/ream) | Prepressing Moisture % | Burst Strength (psi) |
| 15 | 300 | 273 | 57 | 49 |

Table III shows a comparison of the strength of ovenable boards made by the method of this invention and commercially available boards. In each of the following examples, the Mullen burst test pressure of each of the samples was obtained after subjecting the test specimen to a temperature of 232° C. for one hour.

TABLE III

| Comparison of Strengths | | | | | |
|---|---|---|---|---|---|
| Commercial Board | | | This Invention | | |
| Ref. No. | Basis Wt. (lb/ream) | Burst (psi) | Ref. No. | Basis Wt. (lb/ream) | Burst (psi) |
| 40 | 377 | 31 | 3 | 372 | 58 |
| 41 | 320 | 35 | 24 | 329 | 66 |
| 42 | 262 | 23 | 34 | 252 | 63 |

It will be seen from the above comparisons of strengths of commercial boards of comparable basis weights with boards produced by the method of this invention, that the method of this invention produces ovenable board of superior quality as compared with conventionally processed ovenable board.

I claim:

1. A method of forming a molded article consisting essentially of wood cellulose papermaking fibers and up to 8 percent by weight of synthetic fibers capable of withstanding temperatures as high as 400° F. without fusion, comprising forming a sheet of said fibers with a water content in the range of from about 50% to about 100% by weight based on the weight of the dry fibers; and disposing the formed sheet having said water content in a mold and pressing and drying said sheet at a pressure in a range from about 100 psi to about 1,000 psi while maintaining said mold at a temperature in a range of from about 200° F. to about 400° F.

2. A method as defined in claim 1 wherein said cellulosic fibers are unbleached kraft fibers having an average cell wall thickness of at least 2.4 microns.

3. The method of claim 1 wherein said synthetic fibers are selected from the group consisting of polyethylene terephthalates, aromatic polyamides, and condensation products of adipic acid and hexamethylene diamine, and said wood pulp is an unbleached softwood kraft pulp.

4. The method of claim 3, wherein said synthetic fibers have a length of from about ½ to about 1½ inches and a diameter in the range of from about 1½ to about 6 denier.

5. The method of claim 3 wherein said synthetic fibers comprise from about 2% to about 7% by weight of said fibers in said pulp.

6. The method of claim 1 wherein said molding pressure is in the range of from about 100 psi to about 300 psi.

7. The method of claim 4 wherein said molding pressure is in the range of from about 200 to about 300 psi.

8. The method of claim 4 wherein said mold temperature is from about 300° F. to about 400° F.

9. The method of claim 8 wherein said mold temperature is about 375° F.

10. The method of claim 1 wherein said formed sheet has a basis weight of from about 208 to about 440 pounds per ream.

11. The method of claim 1 wherein said sheet is first formed with a water content in the range of from about 300 to about 600 weight percent basis the weight of the dry fibers and predried to a water content in the range of 50% to 100% by weight prior to pressing in said mold.

12. An improved article of paperboad for use at elevated temperatures encountered in food cooking ovens, made according to the process of claim 1.

* * * * *